United States Patent
Lang et al.

(10) Patent No.: US 7,354,976 B2
(45) Date of Patent: Apr. 8, 2008

(54) ISOBUTENE POLYMER FUNCTIONALIZATION BY MEANS OF HYDROBORATION

(75) Inventors: Gabriele Lang, Mannheim (DE); Hans Peter Rath, Gruenstadt (DE); Helmut Mach, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 212 days.

(21) Appl. No.: 10/543,510

(22) PCT Filed: Jan. 27, 2004

(86) PCT No.: PCT/EP2004/000689

§ 371 (c)(1),
(2), (4) Date: Jul. 27, 2005

(87) PCT Pub. No.: WO2004/067583

PCT Pub. Date: Aug. 12, 2004

(65) Prior Publication Data

US 2006/0142503 A1    Jun. 29, 2006

(30) Foreign Application Priority Data

Jan. 28, 2003    (DE) .............................. 103 03 275

(51) Int. Cl.
C08C 19/00 (2006.01)
C08C 8/00 (2006.01)
(52) U.S. Cl. .................... 525/337; 525/333.7
(58) Field of Classification Search ................ 525/337, 525/333.7
See application file for complete search history.

(56) References Cited

U.S. PATENT DOCUMENTS

| | | | |
|---|---|---|---|
| 4,316,973 A * | 2/1982 | Kennedy | ................ 525/333.7 |
| 4,327,201 A | 4/1982 | Kennedy et al. | |
| 4,342,849 A | 8/1982 | Kennedy | |
| 4,939,184 A | 7/1990 | Kennedy | |
| 4,946,889 A | 8/1990 | Nishioka | |
| 5,169,914 A | 12/1992 | Kaszas et al. | |
| 5,242,983 A | 9/1993 | Kennedy et al. | |
| 5,690,861 A | 11/1997 | Faust | |
| 5,981,785 A | 11/1999 | Faust et al. | |

FOREIGN PATENT DOCUMENTS

| | | |
|---|---|---|
| DE | 40 25 961 | 2/1992 |
| EP | 206 756 | 12/1986 |
| EP | 264 214 | 4/1988 |
| EP | 265 053 | 4/1988 |
| JP | 3-115402 | 5/1991 |
| JP | 4-288309 | 10/1992 |
| WO | 99/24480 | 5/1999 |

OTHER PUBLICATIONS

Brown et al., J. A. Chem. Soc., 83, 1241(1961).*
Bela Ivan et al., "New Telechelic Polymers and Sequential Copolymers by Polyfunctional Initiator-Transfer Agents (Inifers). VII. Synthesis and Characterization of α,ω-Di(hydroxy)polyisobutylene", Journal of Polymer Science: Polymer Chemistry Edition, vol. 18, pp. 3177-3191 1980.
Bela Ivan et al., "Living Carbocationic Polymerization. XXX. One-Pot Synthesis of Allyl-Terminated Linear and Tri-Arm Star Polyisobutylenes, and Epoxy- and Hydroxy-Telechelics Therefrom", Journal of Polymer Science: Part A: Polymer Chemistry, vol. 28, pp. 89-104 1990.
Munmaya K. Mishra et al., "New Telechelic Polymers and Sequential Copolymers by Polyfunctional Initiator-Transfer Agents (Inifers) 47. Dehydrochlorination Studies of 'CI-PIB-CI': Quantitative Dehydrochlorination to α, ω-Di (Isopropenyl)-PIB by NaOEt", Polymer Bulletin, vol. 13, pp. 435-439 1985.
Savvas Hadjikyriacou et al, "Living Coupling Reaction in Living Cationic Polymerization. 3. Coupling Reaction of Living Polyisobutylene Using Bis(furanyl) Derivatives", MACROMOLECULES, vol. 33, pp. 730-733 2000.
Savvas Hadjikyriacou et al, "Cationic Macromolecular Design and Synthesis Using Furan Derivatives", Macromolecules, vol. 32, No. 20, pp. 6393-6399 Oct. 5, 1999.
Savvas Hadjikyriacou et al, "Coupling and linking reactions of living polyisobutylene by allylsilanes", Polymer Bulletin, vol. 43, pp. 121-128 1999.
Young Cheol Bae, et al, "Living Coupling Reaction in Living Cationic Polymerization. 1. Coupling Reaction of Living Polyisobutylene", MACROMOLECULES, vol. 30, pp. 198-203 1997.
Young Cheol Bae, et al, Living Coupling Reaction in Living Cationic Polymerization. 2. Synthesis and Characterization of Amphiphilic $A_2B_2$ Star-Block Copolymer: Poly[bis(isobutylene-star-bis(methyl vinyl ether)], MACROMOLECULES, vol. 31, pp. 2480-2487 1998.
Robson F. Storey et al, "In Situ Coupling of Living Polyisobutylene", Polymer Preprints, vol. 39, pp. 327-328 1998.

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

A process is described for functionalizing isobutene polymers having terminal olefinic unsaturation by treating with the reaction product of a borane source with from 0.5 to 1.8 equivalents of an alkene having a molecular weight of less than 250 per mole of borane or by treating the isobutene polymer with the borane source in the presence of the alkene. The reaction mixtures retain low viscosity and good stirrability.

19 Claims, No Drawings

ISOBUTENE POLYMER FUNCTIONALIZATION BY MEANS OF HYDROBORATION

The present invention relates to a process for functionalizing isobutene polymers by hydroboration for example for preparing hydroxy-terminated telechelic polyisobutenes.

Polyisobutenes which bear hydroxyl groups at both ends in the case of linear polymers or at all of the ends of the branches in the case of star-shaped polymers are valuable compounds, for example, for preparing polyurethanes. It is known that polyisobutenes having terminal unsaturation ("telechelic polyisobutene olefins") can be reacted with a hydroborating agent and the resulting polyisobutenylborane can be treated with an oxidizing agent to obtain an alcohol which corresponds to the anti-Markovnikov hydration product of the olefin.

For instance, U.S. Pat. No. 4,316,973 and U.S. Pat. No. 4,342,849 disclose the regioselective hydroboration of α,ω-di(isobutenyl)polyisobutene by reaction of terminally unsaturated polyisobutene with 9-borabicyclo[3.3.1]nonane (9-BBN). The hydroboration product is subsequently treated with alkaline hydrogen peroxide.

U.S. Pat. No. 4,939,184 describes the preparation of a polyurethane foam. The polyol component is a poly-hydroxy-terminated polyisobutene which is obtained by hydroboration of terminally unsaturated polyisobutene with borane in tetrahydrofuran and subsequent oxidation with alkaline hydrogen peroxide.

U.S. Pat. No. 5,242,983 describes the esterification of polyisobutenetriol with methacryloyl chloride and the subsequent free-radical polymerization of the methacrylate with methyl methacrylate. The polyisobutenetriol is obtained by hydroboration with 9-BBN and alkaline oxidation.

B. Ivan, J. P. Kennedy, V. S. C. Chang, J. Polym. Sci., Polym. Chem. 1980, 18, 3177-3191 describe the preparation of α,ω-di(3-hydroxy-2-methylpropyl)polyisobutene by hydroboration and subsequent alkaline oxidation. The hydroboration is effected using an excess of 9-BBN or borane-tetrahydrofuran. A 2% by weight solution of the polymer in tetrahydrofuran is used.

B. Ivan, J. P. Kennedy, J. Polym. Sci., Polym. Chem. 1990, 28, 89-104 describe the hydroboration of bis(allyl)-terminated polyisobutene with 9-BBN in tetrahydrofuran.

JP 3 115 402 discloses the hydroboration of polyisobutene having a molar mass of 2300 with sodium borohydride and boron trifluoride etherate in tetrahydrofuran in the presence of catechol.

The existing processes have certain disadvantages. When borane is used as the hydroborating agent, high molecular weight trialkylboranes are formed as intermediates. So that the reaction mixture remains of low viscosity and stirrable, it is necessary to work in high dilution with large amounts of solvent. In the case of polyfunctional polyisobutenes in particular, the trialkylboranes can also crosslink in a rubberlike manner, which leads to the formation of troublesome precipitates and deposits and also yield losses. Hydroborating agents such as 9-BBN are expensive and therefore unsuitable for industrial scale processes. Also, only one hydroborating equivalent is available per mole of hydroborating agent.

It is an object of the present invention to provide a functionalization process for isobutene polymers which uses chemicals available on the industrial scale and allows the isobutene polymers to be functionalized substantially quantitatively with the use of relatively small amounts of hydroborating agent and relatively small amounts of solvent.

We have found that this object is achieved by a process for functionalizing isobutene polymers by reacting an isobutene polymer having at least one terminal olefinic unsaturation with a hydroborating agent, wherein the hydroborating agent used is the reaction product of a borane source with from 0.5 to 1.8, preferably from 0.8 to 1.5, equivalents of an alkene having a molecular weight of less than 250, preferably from 70 to 200, per mole of borane, or by reacting the isobutene polymer with a borane source in the presence of 0.5 to 1.8, preferably 0.8 to 1.5, equivalents of the alkene.

The process according to the invention enables the hydroboration of high molecular weight isobutene polymers in the presence of comparatively small amounts of solvent or diluent; the reaction mixture still retains low viscosity and good stirrability. The process also permits efficient use of the hydroborating agent.

The general basics of hydroboration are described in J. March, Advanced organic Chemistry, 4th edition, John Wiley & Sons, p. 783-789, which is incorporated herein by way of reference. The suitable borane sources include in particular borane ($BH_3$) itself. It is well known to those skilled in the art that borane occurs mainly in the form of its dimer, diborane ($B_2H_6$). For the purposes of the application, the term "borane" is intended to include the dimers and the higher oligomers of borane. The amount or number of moles are based on the $BH_3$ formula unit.

Advantageously, the borane is generated in situ by reaction of suitable precursors, in particular of alkali metal or alkaline earth metal salts of the $BH_4$ anion, with boron trihalides. In general, sodium borohydride and boron trifluoride etherate are used, since these are readily obtainable and storable substances. The borane source is therefore preferably a combination of sodium borohydride and boron trifluoride etherate.

The kind of substituent at the carbon-carbon double bond of the alkene is not especially critical, in particular in the embodiments of the process where the alkene is added jointly with the isobutene polymer or an aliquot thereof to the initially charged borane source. Suitable are, for example, 1-pentene, 1-hexene, 2-hexene, cyclopentene or cyclohexene. The alkene, however, preferably bears three substituents other than hydrogen at its carbon-carbon double bond. Suitable alkenes can be described by the formula $R^1R^2C=CHR^3$ where $R^1$, $R^2$ and $R^3$ are each independently $C_1$-$C_6$-alkyl and $R^1$ and $R^3$ together may also be $C_3$-$C_5$-alkylene. Especially suitable alkenes are, for example, 2-methyl-2-butene and 1-methylcyclohexene.

In one embodiment, the borane source is reacted with the alkene in advance. For this purpose, the in situ preparation of the borane source can be carried out in the presence of the alkene by initially charging e.g. $NaBH_4$ jointly with the alkene and admixing $BF_3$.

In a preferred embodiment, the isobutene polymer is reacted with the borane source in the presence of the alkene. For the purposes of the invention, "reacting in the presence of the alkene" means that the alkene is added to the reaction mixture at any given point in time, yet before the complete reaction of the isobutene polymer with the borane source. This way, the alkene and the isobutene polymer can be added to the initially charged borane source approximately simultaneously. Alternatively, the borane source can be reacted with an aliquot of the isobutene polymer that is less than the amount at which less than one equivalent borane source is available per double bond of the isobutene polymer, and the remaining quantity of the isobutene polymer can be added after admixture of the alkene or simultaneously with the alkene.

Typically, the hydroborating agent is used in an excess, for example from 1.05 to 2.5 times the stoichiometrically required amount, calculated as hydroborating equivalents based on the double bonds of the isobutene polymer to be hydroborated. The hydroborating equivalents are obtained when the molar amount of the alkene is subtracted from the molar amount of the hydridic hydrogen atoms of the borane source.

Typically, the hydroboration is carried out in a solvent. Suitable solvents for the hydroboration are, for example, acyclic ethers such as diethyl ether, methyl tert-butyl ether, dimethoxyethane, diethylene glycol dimethyl ether, triethylene glycol dimethyl ether, cyclic ethers such as tetrahydrofuran or dioxane, and also hydrocarbons such as hexane or toluene or mixtures thereof. The reaction temperature is determined by the reactivity of the olefinic unsaturation in the isobutene polymer and of the hydroborating agent and is normally between the melting point and boiling point of the reaction mixture, preferably within the range from 0 to 60° C.

Typically, the polyisobutenylboranes formed are not isolated, but rather converted directly to the desired products of value by subsequent reaction. A very important reaction is the treatment of the primary hydroboration products with an oxidizing agent, in particular alkaline hydrogen peroxide, to obtain an alcohol which preferably corresponds formally to the anti-Markovnikov hydration product of the unsaturated isobutene polymer. In addition, the polyisobutenylboranes obtained can be subjected to a reaction with bromine in the presence of hydroxide ions to obtain the bromide.

The isobutene polymer used has at least one terminal olefinic unsaturation. The olefinically unsaturated group may be, for example, aliphatic unsaturated groups having from 2 to 6 carbon atoms, such as vinyl, allyl, methylvinyl, methallyl, propenyl, 2-methylpropenyl, butenyl, pentenyl, hexenyl; or cyclic unsaturated hydrocarbon radicals such as cyclopropenyl, cyclobutenyl, cyclopentenyl and cylohexenyl. Preference is given to isobutene polymers having terminal allyl, methallyl, 2-methylpropenyl or cyclopentenyl groups. Particularly valuable functionalization products for many applications are obtained when the isobutene polymer has a functionality of from 1.8 to 3, i.e. contains from 1.8 to 3 terminal olefinic unsaturations per molecule.

The number-average molecular weight of the isobutene polymer is advantageously from 500 to 50 000, usually from 1000 to 20 000.

Suitable isobutene polymers can be prepared by processes which are described in U.S. Pat. Nos. 4,946,889, 4,327,201, 5,169,914, EP-A-206 756, EP-A-265 053 and also by way of summary in J. P. Kennedy, B. Ivan, "Designed Polymers by Carbocationic Macromolecular Engineering", Oxford University Press, New York, 1991. The isobutene polymers are prepared by living cationic polymerization of isobutene. The initiator system used generally comprises a Lewis acid and an "inifer", i.e. an organic compound having an easily displaceable leaving group which forms a carbocation or a cationic complex with the Lewis acid. The inifer is generally a tertiary halide, a tertiary ester or ether or a compound having a halogen atom at the allyl position, or an alkoxy or acyloxy group at the allyl position. The carbocation or the cationic complex gradually add isobutene molecules to the cationic center to form a growing polymer chain whose end is terminated by a carbocation or the leaving group of the inifer. The inifer may be monofunctional or have a higher functionality, and in the latter case, polymer chains can grow in more than one direction.

Isobutene polymers having terminal unsaturation can be obtained in various ways. It is possible to start from olefinically unsaturated inifer molecules. In order to obtain polyisobutene molecules having more than one terminal unsaturation per molecule, it is likewise possible to introduce an olefinic unsaturation at the distal chain end or couple two or more living polymer chains. Both possibilities are described in detail hereinbelow.

An alternative is to start from inifer molecules without olefinic unsaturation and terminate the distal chain end or ends to form an ethylenically unsaturated group by, for example, reacting the reactive chain end with a terminating reagent which adds an ethylenically unsaturated group to the chain end, or by treating in a manner suitable to convert the reactive chain end to such a group.

Suitable inifer molecules without olefinic unsaturation can be illustrated by the formula $AY_n$ where A is an n-valent aromatic radical having from one to four benzene rings which are nonfused, such as benzene, biphenyl or terphenyl, or are fused, such as naphthalene, anthracene, phenanthrene or pyrene, or is an n-valent aliphatic linear or branched radical having from 3 to 20 carbon atoms. Y is $C(R^4)(R^5)X$, where $R^4$ and $R^5$ are each independently hydrogen, $C_1$-$C_4$-alkyl, in particular methyl, or phenyl, and X is halogen, $C_1$-$C_6$-alkoxy or $C_1$-$C_6$-acyloxy, with the proviso that $R^4$ is phenyl when A is an aliphatic radical. n is an integer from 1 to 4, preferably from 2 to 4, in particular 2 or 3. Suitable examples are p-dicumyl chloride, m-dicumyl chloride or 1,3,5-tricumyl chloride.

An example of an inifer molecule having olefinic unsaturation is a compound of the formula I

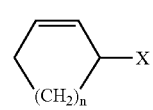

(I)

where

X is halogen, $C_1$-$C_6$-alkoxy or $C_1$-$C_6$-acyloxy and n is 1, 2 or 3.

A particularly suitable compound of the formula I is 3-chlorocyclopentene.

Useful Lewis acids include covalent metal halides and semimetal halides which have an electron pair vacancy. They are generally selected from halogen compounds of titanium, of tin, of aluminum, of vanadium or of iron, and also the halides or boron. Preference is given to the chlorides, and, in the case of aluminum, also to the monoalkylaluminum dichlorides and the dialkylaluminum chlorides. Preferred Lewis acids are titanium tetrachloride, boron trichloride, boron trifluoride, tin tetrachloride, aluminum trichloride, vanadium pentachloride, iron trichloride, alkylaluminum dichlorides and dialkylaluminum chlorides. Particularly preferred Lewis acids are titanium tetrachloride, boron trichloride and boron trifluoride, and in particular titanium tetrachloride.

It has proven useful to carry out the polymerization in the presence of an electron donor. Useful electron donors are aprotic organic compounds which have a free electron pair located on a nitrogen, oxygen or sulfur atom. Preferred donor compounds are selected from pyridines, such as pyridine itself, 2,6-dimethylpyridine, and also sterically hindered pyridines such as 2,6-diisopropylpyridine and 2,6-di-tert-butylpyridine; amides, in particular N,N-dialkylamides of aliphatic or aromatic carboxylic acids, such as N,N-dimethylacetamide; lactams, in particular N-alkyl lactams such as N-methylpyrrolidone; ethers, e.g. dialkyl ethers such as diethyl ether and diisopropyl ether, cyclic ethers such as tetrahydrofuran; amines, in particular trialkylamines such as triethylamine; esters, in particular $C_1$-$C_4$-alkyl esters of aliphatic $C_1$-$C_6$-carboxylic acids, such as ethyl acetate; thioethers, in particular dialkyl thioethers or alkyl aryl thioethers, such as methyl phenyl sulfide; sulfoxides, in particular dialkyl sulfoxides, such as dimethyl sulfoxide; nitriles, in particular alkylnitriles such as acetonitrile and propionitrile; phosphines, in particular trialkylphosphines or triarylphosphines, such as trimethylphosphine, triethylphosphine, tri-n-butylphosphine and triphenylphosphine, and nonpolymerizable, aprotic organosilicon compounds which have at least one organic radical bonded via oxygen. Among the abovementioned donors, preference is given to pyridine and sterically hindered pyridine derivatives, and also in particular to organosilicon compounds such as dimethoxydiisopropylsilane, dimethoxyisobutylisopropylsilane, dimethoxydi(isobutyl)silane, dimethoxydicyclopentylsilane, dimethoxyisobutyl-2-butylsilane, diethoxyisobutylisopropylsilane, triethoxytolylsilane, triethoxybenzylsilane and triethoxyphenylsilane.

The Lewis acid is used in an amount sufficient to form the initiator complex. The molar ratio of Lewis acid to initiator is generally from 10:1 to 1:10, in particular from 1:1 to 1:4, and especially from 1:1.5 to 1:4.

Suitable isobutene sources for preparing the isobutene polymer are both isobutene itself and isobutenic $C_4$ hydrocarbon streams, for example $C_4$ raffinates, $C_4$ cuts from isobutene dehydrogenation, $C_4$ cuts from steam crackers, FCC plants (FCC: fluid catalyzed cracking), as long as they are substantially freed of 1,3-butadiene contained therein.

In addition to isobutene units, the isobutene polymer can also contain units of olefinically unsaturated monomers which are copolymerizable with isobutene under cationic polymerization conditions. The comonomers can be randomly distributed in the polymer or be arranged as blocks. The isobutene content in the isobutene polymer is preferably more than 80% by weight, in particular more than 90% by weight and, more preferably, more than 95% by weight.

Useful copolymerizable monomers include vinylaromatics such as styrene and α-methylstyrene, $C_1$-$C_4$-alkylstyrenes such as 2-, 3- and 4-methylstyrene, and also 4-tert-butylstyrene, isoolefins having from 5 to 10 carbon atoms such as 2-methylbutene-1,2-methylpentene-1,2-methylhexene-1,2-ethylpentene-1,2-ethylhexene-1 and 2-propylheptene-1. Useful comonomers are also olefins which have a silyl group, such as 1-trimethoxysilylethene, 1-(trimethoxysilyl)propene, 1-(trimethoxysilyl)-2-methylpropene-2,1-[tri(methoxyethoxy)silyl]ethene, 1-[tri(methoxyethoxy)silyl]propene, and 1-[tri(methoxyethoxy)silyl]-2-methylpropene-2.

The polymerization is customarily carried out in a solvent, such as aliphatic hydrocarbons, e.g. ethane, isopropane and n-propane, n-butane and its isomers, n-pentane and its isomers, n-hexane and its isomers, cyclopentane, methylcyclopentane, cyclohexane, methylcyclohexane, cycloheptane, ethene, isoprene and n-propene, n-butene, n-pentene, n-hexene and n-heptene, cyclopentene, cyclohexene and cycloheptene, aromatic hydrocarbons such as toluene, xylene, ethylbenzene, or else halogenated hydrocarbons such as halogenated aliphatic hydrocarbons, e.g. chloromethane, dichloromethane, trichloromethane, chloroethane, 1,2-dichloroethane and 1,1,1-trichloroethane and 1-chlorobutane, and also halogenated aromatic hydrocarbons such as chlorobenzene and fluorobenzene. Particularly useful solvents have proven to be mixtures of aliphatic or aromatic hydrocarbons with halogenated hydrocarbons, such as dichloromethane/n-hexane, dichloromethane/cyclohexane, dichloromethane/toluene, chloromethane/n-hexane and the like.

In general, the polymerization is carried out at temperatures below 0° C., for example in the range from 0 to –140_C. The reaction pressure is of minor importance.

In order to introduce an olefinic unsaturation at the distal chain end, the reactive chain end is reacted with a terminating reagent which adds an olefinically unsaturated group to the chain end, or the reactive chain end is reacted in a manner suitable to convert it to such a group.

In the simplest embodiment, the chain end is subjected to a dehydrohalogenation reaction, for example by thermal treatment, for example by heating to a temperature of from 70 to 200° C., or by treating with a base. Example of suitable bases are alkali metal alkoxides, such as sodium methoxide, sodium ethoxide and potassium tert-butoxide, basic aluminum oxide, alkali metal hydroxides such as sodium hydroxide, and tertiary amines such as pyridine or tributylamine, cf. Kennedy et al., Polymer Bulletin 1985, 13, 435-439. Preference is given to using sodium ethoxide.

Alternatively: the chain end is terminated by adding a trialkylallylsilane compound, for example trimethylallylsilane. The use of the allylsilanes leads to the termination of the polymerization with introduction of an allyl radical at the polymer chain end, cf. EP 264 214.

In a further embodiment, the reactive chain end is reacted with a conjugated diene such as butadiene (cf. DE-A 40 25 961) or a nonconjugated diene such as 1,9-decadiene or an alkenyloxystyrene such as p-hexenyloxystyrene (cf. JP-A-4-288309).

In a further embodiment, two or more living polymer chains are coupled by adding a coupling agent. "Coupling" means formation of chemical bonds between the reactive chain ends, so that two or more polymer chains are joined to form one molecule. The molecules obtained by coupling are symmetrical telechelic or starlike molecules having groups of the inifer, for example, cyclopentenyl groups, at the molecule ends or at the ends of the branches of the starlike molecule.

Suitable coupling agents have, for example, at least two electrophilic leaving groups, for example trialkylsilyl groups, in the allyl position to the same or different double bonds, so that the cationic center of a reactive chain end can add on in a concerted reaction with detachment of the leaving group and shifting of the double bond. Other coupling agents have at least one conjugated system, to which the cationic center of a reactive chain end can add electrophilically to form a stabilized cation. The detachment of a leaving group, for example a proton, then results in a stable sigma-bond to the polymer chain with reformation of the conjugated system. A plurality of these conjugated systems can be joined together by inert spacers.

The suitable coupling agents include:

(i) compounds which have at least two 5-membered heterocycles having a heteroatom selected from oxygen, sulfur and nitrogen, for example organic compounds which have at least two furan rings, such as

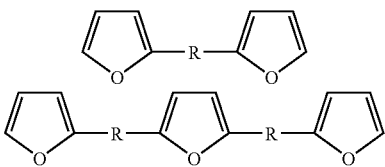

where R is $C_1$-$C_{10}$-alkylene, preferably methylene or 2,2-propanediyl;

(ii) compounds having at least two trialkylsilyl groups in the allyl position, such as 1,1-bis(trialkylsilylmethyl)ethylenes, e.g. 1,1-bis(trimethylsilylmethyl)ethylene, bis[(trialkylsilyl)propenyl]benzenes, e.g.

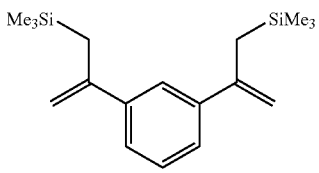

(where Me is methyl), (iii) compounds having at least two vinylidene groups conjugated to two aromatic rings each, such as bis(diphenylethylene), e.9g.

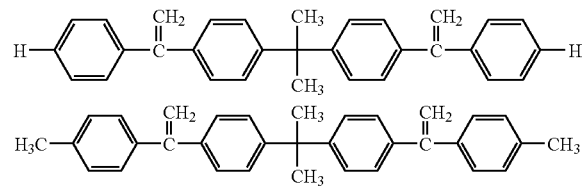

A description of suitable coupling agents can be found in the following references; the coupling reaction can be carried out in a similar manner to the reactions described there: R. Faust, S. Hadjikyriacou, Macromolecules 2000, 33, 730-733; R. Faust, S. Hadjikyriacou, Macromolecules 1999, 32, 6393-6399; R. Faust, S. Hadjikyriacou, Polym. Bull. 1999, 43, 121-128; R. Faust, Y. Bae, Macromolecules 1997, 30, 198; R. Faust, Y. Bae, Macromolecules 1998, 31, 2480; R. Storey, Maggio, Polymer Preprints 1998, 39, 327-328; WO99/24480; U.S. Pat. No. 5,690,861 and U.S. Pat. No. 5,981,785.

The coupling is generally effected in the presence of a Lewis acid, and suitable Lewis acids are those which can also be used for carrying out the actual polymerization reaction. Also suitable for carrying out the coupling reaction are the same solvents and temperatures as used for carrying out the actual polymerization reaction. Advantageously, the coupling can therefore be carried out as a one-pot reaction after the polymerization reaction in the same solvent in the presence of the Lewis acid used for polymerization.

The invention is illustrated by the examples which follow.

The terminal hydroxyl groups are determined as follows:

In the $^1$H NMR spectrum, it is possible to differentiate between the protons of the inifer, of the end group ($CH_2OH$) and those of the main chain. The number of OH groups per mole of polymer can be determined from the intensity ratio of the resonances. The OH number [mg KOH/g] was determined by reacting with acetic anhydride and subsequently titrating with potassium hydroxide solution.

EXAMPLE 1

A 4 l three-neck flask equipped with stirrer, condenser and dropping funnel was initially charged with 100 mmol of $NaBH_4$ and 140 mmol of 2-methyl-2-butene in 500 ml of tetrahydrofuran and admixed dropwise at room temperature with 130 mmol of $BF_3$ etherate. After stirring at room temperature for one hour, a solution of 472 g of a telechelic olefinically terminated polyisobutene ($M_n$=4550) (prepared starting from 1,3-dicumyl chloride, terminated by —$C(CH_3)$=$CH_2$) in 800 ml of tetrahydrofuran was added dropwise. The mixture was stirred at room temperature for 3 hours and then the excess hydride was destroyed by cautiously adding 80 ml of water. After addition of 100 ml of 3N NaOH, oxidation was effected at 40° C. by adding 80 g of 30% hydrogen peroxide. After stirring at room temperature for a further 2 hours, the reaction product was isolated. The GPC is identical to that of the starting product within the margin of error ($M_n$=4550, $M_w/M_n$=1.37). A degree of functionalization of 1.8 could be determined from the $^1$H NMR spectrum; the OH number was 22.

EXAMPLE 2

A 4 l three-neck flask equipped with stirrer, condenser and dropping funnel was initially charged with 130 ml of a 1 molar solution of $BH_3$ in tetrahydrofuran and 140 mmol of 2-methyl-2-butene in 350 ml of tetrahydrofuran. Subsequently, a solution of 471 g of a telechelic olefinically terminated polyisobutene ($M_n$=4550) in 800 ml of tetrahydrofuran was added dropwise. The mixture was stirred at room temperature for 3 hours and then the excess hydride was destroyed by cautiously adding 80 ml of water. After addition of 100 ml of 3N NaOH, oxidation was effected at 40° C. by adding 80 g of 30% hydrogen peroxide. After stirring at room temperature for a further 2 hours, the reaction product was isolated. The GPC is identical to that of the starting product within the margin of error ($M_n$=4550, $M_w/M_n$=1.37). A degree of functionalization of 1.8 could be determined from the $^1$H NMR spectrum; the OH number was 22.

EXAMPLE 3

A 4 l three-neck flask equipped with stirrer, condenser and dropping funnel was initially charged with 188 mmol of $NaBH_4$ and 275 mmol of 1-methyl-1-cyclohexene in 500 ml of tetrahydrofuran and admixed dropwise at room temperature with 250 mmol of $BF_3$ etherate. After stirring at room temperature for one hour, a solution of 470 g of a telechelic olefinically terminated polyisobutene ($M_n$=4550) in 800 ml of tetrahydrofuran was added dropwise. The mixture was stirred at room temperature for 3 hours and then the excess $NaBH_4$ was destroyed by cautiously adding 80 ml of water. After addition of 100 ml of 3N NaOH, oxidation was effected at 40° C. by adding 80 g of 30% hydrogen peroxide. After stirring at room temperature for a further 2 hours, the reaction product was isolated. The GPC is identical to that of the starting product within the margin of error ($M_n$=4550, $M_w/M_n$=1.37). A degree of functionalization of 1.9 could be determined from the $^1$H NMR spectrum; the OH number was 23.

EXAMPLE 4

A 4 l three-neck flask equipped with stirrer, condenser and dropping funnel was initially charged with 100 mmol of $NaBH_4$ in 500 ml of tetrahydrofuran and admixed dropwise at room temperature with 130 mmol of $BF_3$ etherate. After stirring at room temperature for one hour, a solution of 472 g of a telechelic olefinically terminated polyisobutene ($M_n$=4550) (prepared starting from 1,3-dicumyl chloride, terminated with —C(CH$_3$)=CH$_2$) and 140 mml 1-methyl-1-cyclohexene in 800 ml of tetrahydrofuran were added dropwise jointly. The mixture was stirred at room temperature for 3 hours and then the excess hydride was destroyed by cautiously adding 80 ml of water. After addition of 100 ml of 3N NaOH, oxidation was effected at 40° C. by adding 80 g of 30% hydrogen peroxide. After stirring at room temperature for a further 2 hours, the reaction product was isolated. The GPC is identical to that of the starting product within the margin of error ($M_n$=4550, $M_w/M_n$=1.21). A degree of functionalization of 1.9 could be determined from the $^1$H NMR spectrum; the OH number was 23.

EXAMPLE 5

A 4 l three-neck flask equipped with stirrer, condenser and dropping funnel was initially charged with 85 mmol of $NaBH_4$ in 500 ml of tetrahydrofuran and admixed dropwise at room temperature with 111 mmol of $BF_3$ etherate. After stirring at room temperature for one hour, a solution of 150 g of a telechelic olefinically terminated polyisobutene ($M_n$=4550) (prepared starting from 1,3-dicumyl chloride, terminated with —C(CH$_3$)=CH$_2$) in 400 ml of tetrahydrofuran was added dropwise, followed by a solution of 322 g of the same PIB and 95 mmol 1-methyl-1-cyclohexene. The mixture was stirred at room temperature for 3 hours and then the excess hydride was destroyed by cautiously adding 80 ml of water. After addition of 100 ml of 3N NaOH, oxidation was effected at 40° C. by adding 80 g of 30% hydrogen peroxide. After stirring at room temperature for a further 2 hours, the reaction product was isolated. The GPC is identical to that of the starting product within the margin of error ($M_n$=4550, $M_w/M_n$=1.21). A degree of functionalization of 1.9 could be determined from the $^1$H NMR spectrum; the OH number was 23.

COMPARATIVE EXAMPLE

A 4 l three-neck flask equipped with stirrer, condenser and dropping funnel was initially charged with 180 ml of a 1 molar solution of $BH_3$ in tetrahydrofuran. Subsequently, a solution of 420 g of a telechelic olefinically terminated polyisobutene ($M_n$=3000) in 1 l of tetrahydrofuran was added dropwise at 0° C. within 25 min. The mixture was stirred at room temperature for 4 hours and then the excess hydride was destroyed by cautiously adding 40 ml of water. After addition of 50 ml of 3N NaOH, oxidation was effected at 40° C. by adding 40 g of 30% hydrogen peroxide. After stirring for one hour, the reaction product was purified by aqueous workup and subsequently characterized. A comparison of the GPC curves before and after the hydroboration shows a broadening of the molecular weight distribution and a rise in the molecular weight $M_n$. These observations indicate di- and trimerization of the telechelics.

We claim:

1. A process for functionalizing isobutene polymers comprising (1) reacting an isobutene polymer comprising at least one terminal olefinic unsaturation with a hydroborating agent, wherein the hydroborating agent used is the reaction product of a borane source with from 0.5 to 1.8 equivalents of an alkene comprising a molecular weight of less than 250 per mole of borane, or (2) reacting the isobutene polymer with the borane source in the presence of 0.5 to 1.8 equivalents of the alkene.

2. The process as claimed in claim 1, wherein the carbon-carbon double bond of the alkene bears three substituents other than hydrogen.

3. The process as claimed in claim 2, wherein the alkene is 2-methyl-2-butene, 1-methylcyclohexene, or a combination thereof.

4. The process as claimed in claim 1, wherein the borane source is a combination of sodium borohydride and boron trifluoride etherate.

5. The process of claim 1, wherein the primary hydroboration product is treated with an oxidizing agent.

6. The process as claimed in claim 5, wherein the oxidizing agent is hydrogen peroxide in an alkaline medium.

7. The process of claim 1, wherein the isobutene polymer has from 1.8 to 3 terminal olefinic unsaturations.

8. The process of claim 1, wherein the alkene is added to the initially charged borane source simultaneously with the isobutene polymer.

9. The process of claim 1, wherein the borane source is reacted with an aliquot of the isobutene polymer that is less than the amount at which less than an equivalent of borane source is available per double bond of the isobutene polymer, and the remaining quantity of the isobutene polymer is added after the admixture of the alkene or simultaneously with the alkene.

10. The process as claimed in claim 2, wherein the borane source is a combination of sodium borohydride and boron trifluoride etherate.

11. The process as claimed in claim 3, wherein the borane source is a combination of sodium borohydride and boron trifluoride etherate.

12. The process of claim 2, wherein the primary hydroboration product is treated with an oxidizing agent.

13. The process of claim 3, wherein the primary hydroboration product is treated with an oxidizing agent.

14. The process of claim 4, wherein the primary hydroboration product is treated with an oxidizing agent.

15. The process of claim 2, wherein the isobutene polymer has from 1.8 to 3 terminal olefinic unsaturations.

16. The process of claim 3, wherein the isobutene polymer has from 1.8 to 3 terminal olefinic unsaturations.

17. The process of claim 4, wherein the isobutene polymer has from 1.8 to 3 terminal olefinic unsaturations.

18. The process of claim 5, wherein the isobutene polymer has from 1.8 to 3 terminal olefinic unsaturations.

19. The process of claim 6, wherein the isobutene polymer has from 1.8 to 3 terminal olefinic unsaturations.

* * * * *